United States Patent [19]

Jackson

[11] 3,992,769

[45] Nov. 23, 1976

[54] METHOD OF MAKING A THERMAL BARRIER CONSTRUCTION ELEMENT

[75] Inventor: James C. Jackson, Bartlesville, Okla.

[73] Assignee: Ethyl Corporation, Richmond, Va.

[22] Filed: Oct. 16, 1975

[21] Appl. No.: 622,951

[52] U.S. Cl. .............................. 29/416; 29/155 R; 29/190; 29/418; 29/451; 29/509; 52/403
[51] Int. Cl.² ........................................ B23P 17/00
[58] Field of Search ................. 29/155 R, 416, 418, 29/509, 451, 190; 52/403

[56] References Cited
UNITED STATES PATENTS

| | | | |
|---|---|---|---|
| 3,204,324 | 9/1965 | Nilsen | 29/155 R |
| 3,393,487 | 7/1968 | Nolan | 52/403 |
| 3,411,254 | 11/1968 | Kessler | 52/403 X |
| 3,420,026 | 1/1969 | Nolan | 52/403 |
| 3,441,995 | 5/1969 | Revell et al. | 29/155 R |
| 3,517,472 | 6/1970 | Toth | 52/403 |
| 3,547,603 | 12/1970 | Bragman | 29/418 |
| 3,579,724 | 5/1971 | Toth | 52/403 |
| 3,815,216 | 6/1974 | Brockway | 29/460 |
| 3,823,524 | 7/1974 | Weinstein | 29/155 R |
| 3,903,587 | 9/1975 | Boiardi | 29/418 |

FOREIGN PATENTS OR APPLICATIONS 768,499   2/1957   United Kingdom ............... 52/403

*Primary Examiner*—Charlie T. Moon
*Attorney, Agent, or Firm*—Donald L. Johnson; John F. Sieberth; Paul H. Leonard

[57] ABSTRACT

A method of making a thermal barrier construction element or shape, wherein a single metal construction element of a predetermined design or shape having a suitable opening therein for receiving an insulating member, is extruded in a normal manner, the insulating member is inserted in the receiving opening of the metal extrusion, the metal extrusion is crimped or stitched whereby the insulating member is mechanically locked in position in the metal extrusion, and a portion of the metal extrusion is subsequently removed therefrom to provide the thermal barrier construction element.

5 Claims, 3 Drawing Figures

3,992,769

METHOD OF MAKING A THERMAL BARRIER CONSTRUCTION ELEMENT

BACKGROUND OF THE INVENTION

The present invention relates to a method of making a unitary construction element having a thermal barrier or break therein, commonly referred to as a thermal barrier extrusion, which can be employed in construction of windows, doors, frames therefor, and the like.

The invention generally relates to a method of making a thermobreak member or thermal barrier metal extrusion utilizing a single metal extrusion and a plastic, or the like, insulating member.

The invention especially relates to a method of making a unitary thermal barrier extrusion wherein mechanical means are employed to join an insulating member with a metal extrusion or shape.

A variety of types of thermal barrier constructions and methods therefore have been developed. U.S. Pat. Nos. 3,204,324; 3,393,487; 3,411,254; 3,420,026; 3,517,472; 3,815,216; and 3,823,524 and Swiss Pat. No. 320,998 (same as British Pat. No. 768,499) are illustrative of these.

U.S. Pat. No. 3,204,324 is representative of a method of making a thermal barrier construction element or insulating construction, wherein a metal shape having a generally U-shaped channel therein is filled with a flowing resinous insulating composition; the composition is cured, and subsequently a portion of the metal member or web forming the base of the channel is removed. U.S. Pat. No. 3,823,524 relates to a similar method but employs a web member which extends convexly between the structural member forming the channel. Both of these methods require the use of a liquid resinous composition which is subsequently cured or hardened.

U.S. Pat. No. 3,393,487 discloses a somewhat more complicated process for making a thermal insulating joint construction and also utilizes a liquid plastic material. In such process, two separate elongated metal shapes are spaced apart and fastened together with a solid first insulating member. The two shapes and the first insulating member provide a channel in which a second thermal insulating member is flowed therein. Upon solidification of the latter, the metal and insulating members are locked together as an integral unit. U.S. Pat. No. 3,411,254 provides for another type of plastic thermobreak which utilizes a plastic locking strip which contains a heat actuated blowing agent to join two separate metal shapes. After assembly of the two metal shapes and the plastic strip, the unit is heated to expand the plastic into tight engagement with the two metal members.

U.S. Pat. No. 3,420,026 discloses several types of thermal insulating members and methods of making them. In one type, two separate metal members are mechanically joined to a central insulating member by crimping or deformation of groove means or projections on the metal members. In one particular type of thermal break construction, the insulating member is in the shape of a Maltese cross in cross-section. In another embodiment, the insulating member is made from a thermoplastic material and a portion thereof is heated to cause melting and flow of the plastic into an associated groove means formed by the two metal members. Upon cooling of the plastic, the metal and plastic member are unitarily joined together. U.S. Pat. No. 3,517,472 also illustrates a mechanical joining process similar to that of the former and additionally represents the use of a plastic or insulating member which expands upon heating.

U.S. Pat. No. 3,815,216 illustrates still another method of manufacturing a thermal break construction element and employs a metal extrusion which has a removable interior section which is subsequently removed to separate the extrusion into two metal members. While maintaining the separate metal members spaced apart, a plastic material is inserted therebetween. The construction element can be made in a continuous operation.

The Swiss patent (or British patent) discloses several types of window or door frames, one of which employs a crimp system using two separate metal extrusions having a pair of flanges thereon which form grooves for receiving a plastic rod. After the rod or thermal barrier member is introduced into the grooves, the flanges are pressed towards the plastic rod or crimped thereon so that they are flush with the sides of the rod.

In currently manufacturing thermal barrier extrusions employing a crimp or stitching system, rollers are normally used to provide crimping of the metal flanges on the insulating or plastic member. Conventionally, two rollers or wheels are required to crimp the flanges. One roller must actually bend the metal flanges on the insulating member while the other roller must back-up or hold the metal extrusion in the correct position for joining metal and plastic members. To accomplish the crimping action, clear access must be available on both sides of the plastic member on which crimping of the metal members occurs. In some cases, a small wheel or support is laterally employed to serve as a back-up. The size of the support and the forces required to obtain a tight joint create a number of operating problems. The types of shapes or extrusions which can be used in this method are limited.

The present invention has a number of advantages over these prior art constructions. The invention eliminates the necessity of using two or more separate metal shapes or pieces and eliminates the handling of multiple pieces through normal finishing operations such as painting, anodizing, and other manufacturing and assembly steps. The invention also dispenses with the need for liquid or expandable plastic materials which are difficult to handle and require special equipment.

It is a primary object of the instant invention to provide a crimp system or method of making thermal barrier extrusions which overcomes the disadvantages of prior art systems and which can be used with a wide variety of metal shapes or extrusions.

Another object of the invention is to provide a crimp or stitching system for making thermal barrier construction elements or members wherein a single extrusion is employed.

Other objects and advantages of the present invention will become more readily apparent from a consideration of the description and drawings hereinafter.

SUMMARY OF THE INVENTION

In the present invention, a metal member of a desired or predetermined shape, preferably of aluminum, is extruded in a customary manner to form a pair of spaced apart members with an opening formed therebetween for receiving an insulating barrier therein. Upper and lower flanges or projections extend from each side of the metal members forming the opening into the opening. The upper flanges are spaced apart from each other and form the lower flanges. The lower flanges are also spaced apart from each other. The spaced apart members are joined together at the ends thereof opposite the opening by an end member. An intermediate member also joins the spaced apart members together at a position between the lower flanges and the end member. While the metal member is held in place, a somewhat rigid thermal barrier or insulating member of a cross-section shape suitable for insertion in the opening in the metal member is longitudinally inserted into said opening the length thereof. Subsequently, the upper flanges are crimped on or stitched on the barrier member thereby forming a unitary member. Thereafter, a portion of one adjacent or spaced apart member below the thermal barrier is removed by sawing, milling, or other suitable means. Similarly, the intermediate member is also removed thereby providing a thermal barrier construction element or extrusion.

DESCRIPTION OF THE PREFERRED EMBODIMENT

Figure 1:
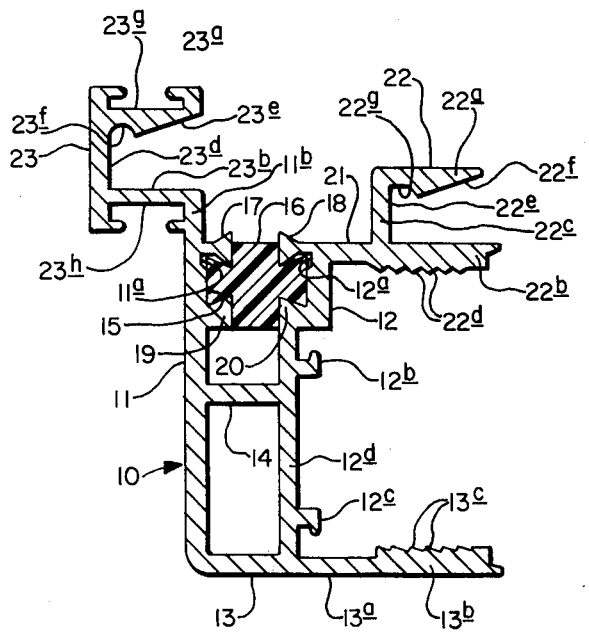
FIG. 1 is a cross-section of a metal member with an insulating member therein just prior to stitching or crimping.

In carrying out the method of the present invention, a metal member is formed of a desired shape. The metal member is preferably an aluminum extrusion. The metal member can be formed in a variety of shapes, depending upon the end use thereof, but is a unitary or one-piece member. In FIG. 1 of the drawings, a metal member 10 suitable for use as a meeting rail in a window or door construction is illustrated in cross-section. The extrusion 10 comprises a pair of spaced apart members 11 and 12 joined together by end member 13 and intermediate member 14. An opening 15 for receiving an insulating member 16 is formed between the members 11 and 12 and above or outwardly of intermediate member 14. A pair of opposing and spaced apart upper flanges or projections 17 and 18 are formed on the members 11 and 12 respectively, and extend more or less into the opening 15. A pair of opposing and spaced apart lower flanges 19 and 20 are also formed on the members 11 and 12 respectively, and similarly extend into the opening 15. The lower flanges 19 and 20 are located on an intermediate portion of the members 11 and 12 between the upper flanges 17 and 18 and intermediate member 14.

The upper flanges or projections 17 and 18 are formed on the members 11 and 12 respectively, in such manner that they may be crimped or bent downwardly on the barrier member 16, after the member 16 has been inserted in the opening 15. FIG. 1 illustrates the extrusion 10 with the plastic member 16 inserted in the opening 15 and with the flanges 17 and 18 in their position as originally formed prior to crimping. The opening 15 formed by upper flanges 17 and 18, lower flanges 19 and 20, and the portions of the members 11 and 12 between the upper and lower flanges thereof, is of a size which permits the barrier or insulating member 16 to be slidably or longitudinally inserted therein.

Grooves 11a and 12a are formed in the members 11 and 12 respectively, adjacent upper flanges 17 and 18, so that when the flanges 17 and 18 are crimped or bent downwardly, the flanges will not break or the metal will not fracture.

In the particular form of the invention illustrated in the drawings, the member 13 is joined to the members 11 and 12 at the lower ends thereof and a portion 13a of the member 13 extends outwardly from the member 12 at a right angle thereto. The outer end 13b of the member 13 is somewhat thickened or enlarged and has a plurality of serrations or longitudinal cuts or grooves 13c on the upper edge thereof.

The member 12 has a pair of oppositely facing and spaced apart small L-shaped projections 12b and 12c extending perpendicularly therefrom. Extending perpendicularly from the member 12 and opposite upper flange 18 is a member 21. A somewhat U-shaped channel member 22 extends from the outer end of the member 21. Channel member 22 comprises legs 22a and 22b joined together by web 22c. One edge of the leg 22b has a plurality of grooves or serrations 22d, similar to those 13c, on an edge thereof facing grooves 13c. Legs 22a and 22b and web 22c form a channel or opening 22e. The leg 22b is somewhat thicker or more enlarged than the member 21, similar to end portion 13b of the member 13. Leg 22a has an angularly disposed edge 22f with a groove 22g formed therein adjacent web 22c.

The member 11 has an end portion 11b which extends upwardly beyond the upper flange 17. A somewhat U-shaped channel member 23 extends perpendicularly from the outer end of end portion 11b. Channel member 23 comprises legs 23a and 23b joined together by web 23c. Channel or opening 23d is formed by the interior surfaces of legs 23a and 23b and web 23c. Leg 23a has an angularly disposed edge 23e with a groove 23f therein adjacent web 23c. Leg 23a also has a weatherstrip channel 23g formed therein for receiving a wool-pile or other suitable weatherstripping material. Leg 23b also has weatherstrip channel 23h formed therein, similar to the channel 23g.

It can be readily appreciated that the shape 10 is illustrative of only one particular type of shape of the instant invention. The end portion 13a of the member 13, the member 21, end portion 11b of the member 11 and the portions extending outwardly from the members may be constructed in a variety of shapes or configurations depending upon the end use of the extrusion or shape 10.

Figure 3:
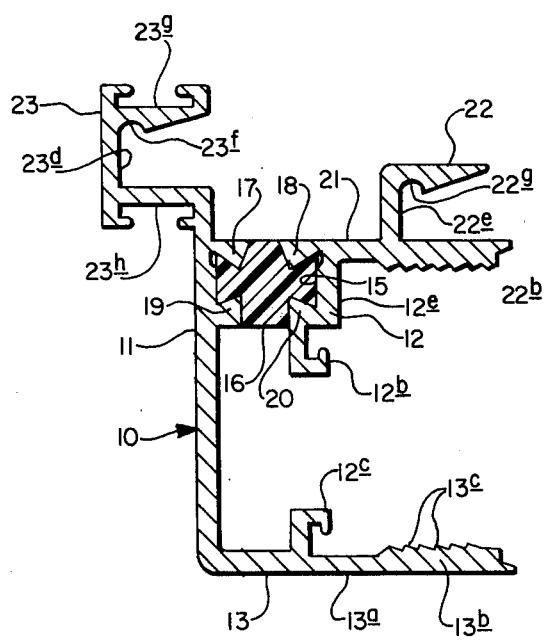

In the form of the invention illustrated in FIG. 3, a plastic member (not shown) is snapped on to the projections 12b and 12c. The plastic snap-on member joins the projections together and provides additional rigidity and stability to the extrusion 10. The plastic member, the exterior surface 12e of the member 12, opposite flanges 18 and 20, interior surface of member 21 and interior surface of portion 13a of end member 13 form a glazing channel for receiving an insulated glass panel. The plastic snap-on member and the exterior surface 12e of the member 12 also provide a stop for the edge of the insulated glass panel to be received adjacent thereto. It can be appreciated that other joining arrangements or connecting means for the extrusion 10 and snap-on plastic member may be employed without departing from the scope of the invention. Some types of extrusions, especially thicker or heavier ones, may not require a plastic snap-on member at all, but relatively thin ones probably will require one. The particular construction illustrated is highly suitable for thin extrusions.

Insulated glass panels are customarily constructed of two glass panels or panels spaced apart by suitable spacers with a glazing gasket around the periphery thereof. The glazing gasket is usually a material which has some degree of softness. Grooves or serrations 13c and 22d aid in securing the insulated glass panel in the glazing channel.

Figure 2:
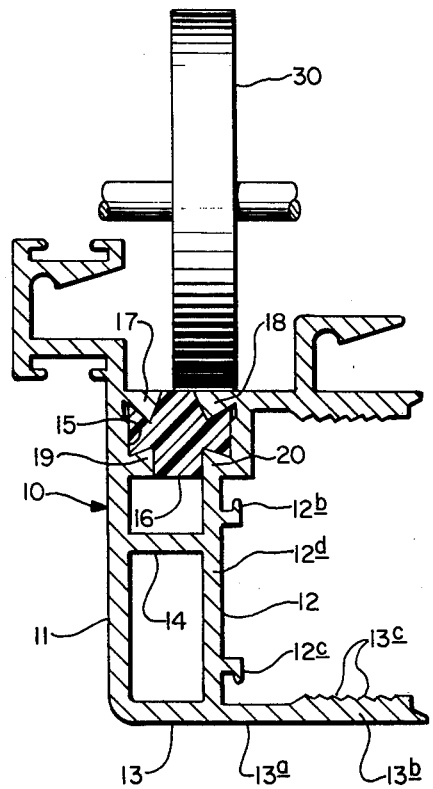
FIG. 2 is a view similar to FIG. 1 illustrating the members after crimping has been acomplished and also shows a method by which such crimping or stitching may be accomplished; and, FIG. 3 is a view similar to FIG. 1 illustrating the finished thermal barrier construction element of the invention.

After the extrusion 10 is formed in a customary manner, with the member 10 appearing in cross-section as illustrated in FIG. 1, an insulating member 16 of similar length is slidably inserted in the opening 15 therefor. Extrusions are normally made in standard lengths, usually 16 feet. After the member 16 is in position, flanges 17 and 18 are then crimped, stitched, or otherwise pressed downwardly on the insulating member 16, thereby locking it in place and forming a unitary construction element. FIG. 2 illustrates the shape 10 after crimping has been completed. Crimping may be accomplished in a variety of ways, and is preferably carried out by passing the extrusion 10 through one or more wheels or rollers. An upper roller 30 is shown in FIG. 2. The member 13 may be adjacent a suitable flat surface or may be moved through a back-up wheel or roller (not shown) similar to that of the roller 30. It can be appreciated that in performing the crimping operation, some type of back-up must be employed. Preferably, the flange 17 is crimped first and thereafter flange 18 is crimped.

The offset position of the member 12 provides for a more effective crimping operation. The intermediate member 14 permits more effective control in forming the extrusion initially. After the crimping operation is completed, the intermediate member 14 and a portion 12d of the member 12 between projections 12b and 12c are removed from the shape 10 by sawing, cutting, milling or other suitable means. Removal of member 14 and portion 12d provides a unitary thermal break construction element of a cross-section shape as illustrated in FIG. 3.

The thermal break construction element is then cut to a desired length. In some instances, it may be desirable to cut the extrusion 10 to a desired length after extrusion and before the insulating member 10 is inserted therein.

The shape 10 may be painted, anodized, or otherwise treated before inserting the member 16 therein. The crimping operation has little or no effect on the surfaces treated.

The meeting rail or thermal break construction element of FIG. 3 is so constructed as to slidably mate with a similarly constructed meeting rail. Two meeting rails are positioned in a window frame so that one is exterior of the other, and when immediately opposite each other, the channel members 22 and 23 of each meeting rail face each other. The two meeting rails are joined together by sliding the leg 22a of channel member 22 on one meeting rail into channel 23d of the other meeting rail, and by sliding the leg 23a of channel member 23 of said one meeting rail into channel 22e of channel member 22 of said other meeting rail. When two meeting rails, i.e., the meeting rail on one insulated glass panel and a meeting rail on another insulated glass panel, are so joined together in a window or door frame mounted in a wall opening, a complete thermal barrier between exterior and interior spaces is formed.

The foregoing disclosure and description of the invention is illustrative and explanatory thereof, and various changes in the size, shape, and materials, as well as in the details of the illustrated construction may be made within the scope of the appended claims without departing from the spirit of the invention.

I claim:

1. A method of making a thermal barrier construction element or shape, comprising the steps of:
   a. preparing a one-piece metal shape, which in cross-section has a pair of spaced apart members joined together by an end member and an intermediate member and a pair of upper and lower flanges spaced apart and opposite each other on the spaced apart members and forming an opening therebetween for receiving an insulating member;
   b. slidably inserting an insulating member in the opening between the spaced apart members formed by the upper and lower flanges;
   c. crimping the upper flanges on the insulating member, whereby the metal shape and the insulating member are locked together forming a unitary construction element; and,
   d. removing the intermediate member and a portion of one of the spaced apart members between the lower flange thereon and the end member thereon, thereby forming a thermal barrier construction element or shape.

2. The method of claim 1, wherein the opening formed by the upper and lower flanges and a portion of each of the spaced apart members between the upper and lower flanges is substantially in the shape of a Maltese cross in cross-section.

3. The method of claim 2, wherein the insulating member is substantially in the shape of a Maltese cross in cross-section.

4. The method of claim 1, wherein said one-piece metal shape is an aluminum extrusion.

5. The method of claim 1, wherein said insulating member is a plastic shape.

* * * * *